(12) United States Patent
Liu et al.

(10) Patent No.: US 10,747,825 B2
(45) Date of Patent: Aug. 18, 2020

(54) CONTENT SEARCH ENGINE

(71) Applicant: Google LLC, Mountain View, CA (US)

(72) Inventors: Bin Liu, Mountain View, CA (US);
Aranyak Mehta, Palo Alto, CA (US);
Xi Tan, Mountain View, CA (US);
Christopher K. Harris, Los Altos, CA (US); Samuel Sze Ming Ieong, Mountain View, CA (US); Gabriel Florin Constantin, Alameda, CA (US)

(73) Assignee: Google LLC, Mountain View, CA (US)

( * ) Notice: Subject to any disclaimer, the term of this patent is extended or adjusted under 35 U.S.C. 154(b) by 345 days.

(21) Appl. No.: 15/444,279

(22) Filed: Feb. 27, 2017

(65) Prior Publication Data

US 2018/0246966 A1 Aug. 30, 2018

(51) Int. Cl.
| | |
|---|---|
| G06F 16/2453 | (2019.01) |
| G06F 16/951 | (2019.01) |
| G06N 20/00 | (2019.01) |
| G06Q 30/02 | (2012.01) |
| G06F 16/9535 | (2019.01) |

(52) U.S. Cl.
CPC ........ *G06F 16/951* (2019.01); *G06F 16/2453* (2019.01); *G06F 16/24542* (2019.01); *G06F 16/9535* (2019.01); *G06N 20/00* (2019.01); *G06Q 30/0272* (2013.01)

(58) Field of Classification Search
CPC .......... G06F 16/9535; G06F 2212/154; G06F 16/2453; G06F 16/24542; G06N 20/00
USPC ........................................................ 707/713
See application file for complete search history.

(56) References Cited

U.S. PATENT DOCUMENTS

| | | | |
|---|---|---|---|
| 9,355,191 B1 * | 5/2016 | Finkelstein | ....... G06F 16/90324 |
| 2014/0129351 A1 | 5/2014 | Ringdahl | |
| 2015/0186158 A1 | 7/2015 | Yalamanchili et al. | |
| 2015/0302009 A1 | 10/2015 | Henderson et al. | |

(Continued)

FOREIGN PATENT DOCUMENTS

| | | |
|---|---|---|
| JP | 2004151947 | 5/2004 |
| JP | 2014182289 | 9/2014 |

OTHER PUBLICATIONS

KR Office Action in Korean Appln. No. 10-2017-7031611, dated Mar. 19, 2019, 12 pages (with English translation).

(Continued)

*Primary Examiner* — Marcin R Filipczyk
(74) *Attorney, Agent, or Firm* — Fish & Richardson P.C.

(57) ABSTRACT

Methods, systems, apparatus, including computer programs encoded on a computer storage medium, for determining whether to execute a query based on a predicted computerized rendering period The method may include actions of receiving a query, determining a set of one or more features based on the query, generating a query vector, providing the query vector to a machine learning model, receiving first data, based on the output of the machine learning model, that is indicative of whether the computerized rendering period associated with the query is likely to satisfy the predetermined threshold, determining based on the first data that the computerized rendering period available for displaying a set of one or more candidate content items that are responsive to the query is not likely to satisfy the predetermined threshold, and determining to not use a search engine to execute the received query.

20 Claims, 3 Drawing Sheets

(56) References Cited

U.S. PATENT DOCUMENTS

2016/0180374 A1   6/2016  Cetintas et al.
2016/0267183 A1*  9/2016  Tan ........................ G06N 20/00
2016/0358230 A1  12/2016  Wilson et al.
2017/0083626 A1*  3/2017  Kensel ..................... G06N 5/04

OTHER PUBLICATIONS

JP Office Action in Japanese Appln. No. 2017-556924, dated Apr. 1, 2019, 6 pages (with English translation).
International Search Report and Written Opinion, issued in International Application No. PCT/US2017/033729, dated Nov. 28, 2017, 15 pages.
PCT International Preliminary Report on Patentability and Written Opinion in International Application No. PCT/US2017033729, dated Aug. 27, 2019, 10 pages.
JP Notice of Allowance in Japanese Application No. 2017-556924, dated Nov. 8, 2019, 5 pages (with English translation).

* cited by examiner

CONTENT SEARCH ENGINE

BACKGROUND

This specification relates to search engines.

A search engine may generally be described as any program that executes a query and retrieves stored data. However, based on the task at hand, a search engine can be configured in a variety of different ways. For example, some search engines may be configured to perform keyword-based search and retrieval. Such search engines may identify relevant search results based, at least in part, on the number of times a search term appears in a particular resource, or the particular resource's metadata. Alternatively, or in addition, some search engines may identify relevant search results by identifying an entity name that is associated with one or more search terms, and then determining the number of occurrences of the entity name in one or more particular resources. However, the aforementioned ways that a search engine can identify search results responsive to a query are merely examples.

SUMMARY

According to one innovative aspect of the present disclosure, a method of determining whether to execute a query based on a predicted computerized rendering period is disclosed. The method may include actions of receiving, by one or more server computers, a query that originated from a client device, wherein the query comprises a request for one or more content items that are stored in a database, determining, by the one or more server computers, a set of one or more features based on the query, generating, by the one or more server computers, a query vector based on the set of one or more features, providing, by the one or more server computers, the query vector to a machine learning model that has been trained to provide an output that is indicative of whether a computerized rendering period for displaying a set of one or more candidate content items that are each responsive to the query satisfies a predetermined threshold, receiving, by the one or more server computers, first data, based on the output of the machine learning model, that is indicative of whether the computerized rendering period for displaying the set of one or more candidate content items that are each responsive to the query satisfies the predetermined threshold, determining, by the one or more server computers based on the first data, when the computerized rendering period available for displaying the set of one or more candidate content items that are each responsive to the query does not satisfy the predetermined threshold, and in response to determining, by the one or more server computers, that the computerized rendering period available for displaying the set of one or more candidate items that are each responsive to the query does not satisfy the predetermined threshold, determining, by the one or more server computers, to not use a search engine to execute the received query.

Other versions include corresponding systems, apparatus, and computer program to perform the actions of methods, encoded on computer storage devices.

According to another innovative aspect of the present disclosure, a system for determining whether to execute a query based on a predicted computerized rendering period is disclosed. The system may include a receiving unit that receives a query that originated from a client device, wherein the query comprises a request for one or more content items that are stored in a database, a feature extraction unit that: determines a set of one or more features based on the query, generates a query vector based on the set of one or more features, and provides the query vector to a machine learning model that has been trained to provide an output that is indicative of whether a computerized rendering period for displaying a set of one or more candidate content items that are each responsive to the query satisfies a predetermined threshold; and a computerized rendering period analysis unit that: receives first data, based on the output of the machine learning model, that is indicative of whether the computerized rendering period for displaying the set of one or more candidate content items that are each responsive to the query satisfies the predetermined threshold, determines, based on the first data, when the computerized rendering period available for displaying the set of one or more candidate content items that are each responsive to the query does not satisfy the predetermined threshold, and in response to determining that the computerized rendering period available for displaying the set of one or more candidate items that are each responsive to the query does not satisfy the predetermined threshold, determines to not use a search engine to execute the received query.

These and other versions may optionally include one or more of the following features. For instance, in some implementations, the method may further include determining, by the one or more server computers, when the computerized rendering period available for displaying the set of one or more candidate content items that are each responsive to the search query does satisfy the predetermined threshold and in response to determining, by the one or more server computers, that the computerized rendering period available for displaying the set of one or more candidate items that are responsive to the query does satisfy the predetermined threshold, determining, by the one or more server computers, to use the search engine to execute the received query.

In some implementations, the one or more features may be derived from context information describing an application that originated the query.

In some implementations, the machine learning model may be trained to provide the output that is indicative of whether the computerized rendering period for displaying the set of one or more candidate content items that are each responsive to the query is likely to satisfy the predetermined threshold.

In some implementations, the machine learning model comprises a logistic regression model.

In some implementations, the predetermined threshold comprises a time period of one second.

In some implementations, the method further includes providing, by the one or more server computers, one or more content items for display in a user interface of the client device.

Conventional search engines typically receive and execute queries. However, execution of every query received by a search engine can lead to the inefficient use of computational resources. Therefore, by selectively executing queries using a system that is programmed in accordance with this specification, one can increase the efficiency of a search engine relative to search engines used by systems that are not programmed in accordance with this specification. Moreover, a system programmed in accordance with this specification can even improve the efficiency of not only the one or more servers hosting the search engine, but also one or more of the client devices that interact with the servers hosting the search engine and the network used to facilitate communication between the one or more client devices and one or more servers.

For example, a search engine may receive millions of queries from different client devices. By selectively executing only a portion of the queries using the systems and methods provided by the present disclosure, a system can reduce the number of queries that need to be processed and executed using the search engine. Such reduction in the amount of queries processed and executed by the search engine can result in a significant reduction in the amount of computational resources expended by the one or more servers hosting the search engine.

Selectively executing only a portion of the received queries means that the one or more servers hosting the search engine will not need to score and rank search results in response to every query. Scoring and ranking search results is a computationally intensive task. Accordingly, selectively executing only a portion of the received queries reduces the number of times that the one or more servers hosting the search engine need to perform the computationally intensive tasks of scoring and ranking search results. As a result, the performance of one or more servers hosting the search engine can be improved, and made more efficient, by selecting executing only a portion of the received queries.

The present disclosure improves other aspects of a system than just the one or more severs hosting a search engine. For example, selective execution of queries will result in the one or more servers hosting the search engine not transmitting search results in response to every received query. Accordingly, by not returning one or more search results to client devices (e.g., mobile devices) when, for example, there is not a sufficient amount of time to meaningfully display the one or more search results on the screen of the mobile device, less network bandwidth is used. Since the one or more servers hosting the search engine are using less network bandwidth to transmit search results to the client devices, more network bandwidth remains available for transmitting other data that will be presented on the screen of one or more devices using the network, transmitting other data to other devices using the network, receiving data from one or more devices using the network, or the like.

Moreover, the present disclosure can even improve the efficiency with which client device (e.g., mobile device) resources are used. For example, client device resources are preserved by not having to download data, render data, or the like when, for example, there is not a sufficient amount of time to meaningfully display the one or more search results on the screen of the client device, thereby freeing up those client device resources to be used on other tasks. In addition, the efficiency gains achieved by client devices because of the system and method provided by the present disclosure can free up client side memory and conserve battery power.

The details of one or more embodiments of the subject matter described in this specification are set forth in the accompanying drawings and the description below. Other features, aspects, and advantages of the subject matter will become apparent from the description, the drawings, and the claims.

The details of these, and other, implementations are set forth in the accompanying drawings and description below. Other features and advantages will be apparent from the description and drawings, and from the claims.

DETAILED DESCRIPTION

The present disclosure is directed to a search and retrieval system that increases the efficiency of search and retrieval by using on a predicted computerized rendering period, relative to an efficiency of a search and retrieval system that executes all queries regardless of the computerized rendering period available for the results of each respective query. A computerized rendering period is an amount of time that a content item returned in response to a query is displayed, visually perceptible, and/or rendered in a computerized user interface of a client device. There are various types of computerized rendering periods, including, e.g., an impression duration. The search and retrieval system also increases the efficiency of search and retrieval by predicting, based on a received query, whether the received query is likely to have a computerized rendering period that exceeds a predetermined threshold and then determining to not execute a received query if it is likely that the computerized rendering period associated with the received query fails to satisfy a predetermined threshold. For example, a system programmed to perform the methods provided by the present disclosure may determine to not execute a query requesting a content item if the predicted computerized rendering period is 1 second or less.

The present disclosure increases the efficiency of a search and retrieval system by reducing the computing resources expended by the search and retrieval system, relative to an efficiency of a search and retrieval system that executes all queries regardless of the computerized rendering period available for the results of each respective query. The present disclosure reduces the amount of processing power expended by a search and retrieval system because received queries are not executed if the search and retrieval system predicts that the query is associated with a computerized rendering period that likely fails to satisfy a predetermined threshold. Moreover, additional computational resources are conserved because the search results for such queries do not need to be scored and ranked. Such search result scoring and ranking processes are resource intensive, and avoiding the execution of such search result scoring and ranking processes can significantly optimize the use of computational resources when compared with systems that do not use a predicted computerized rendering period to avoid execution of certain received queries.

Figure 1:
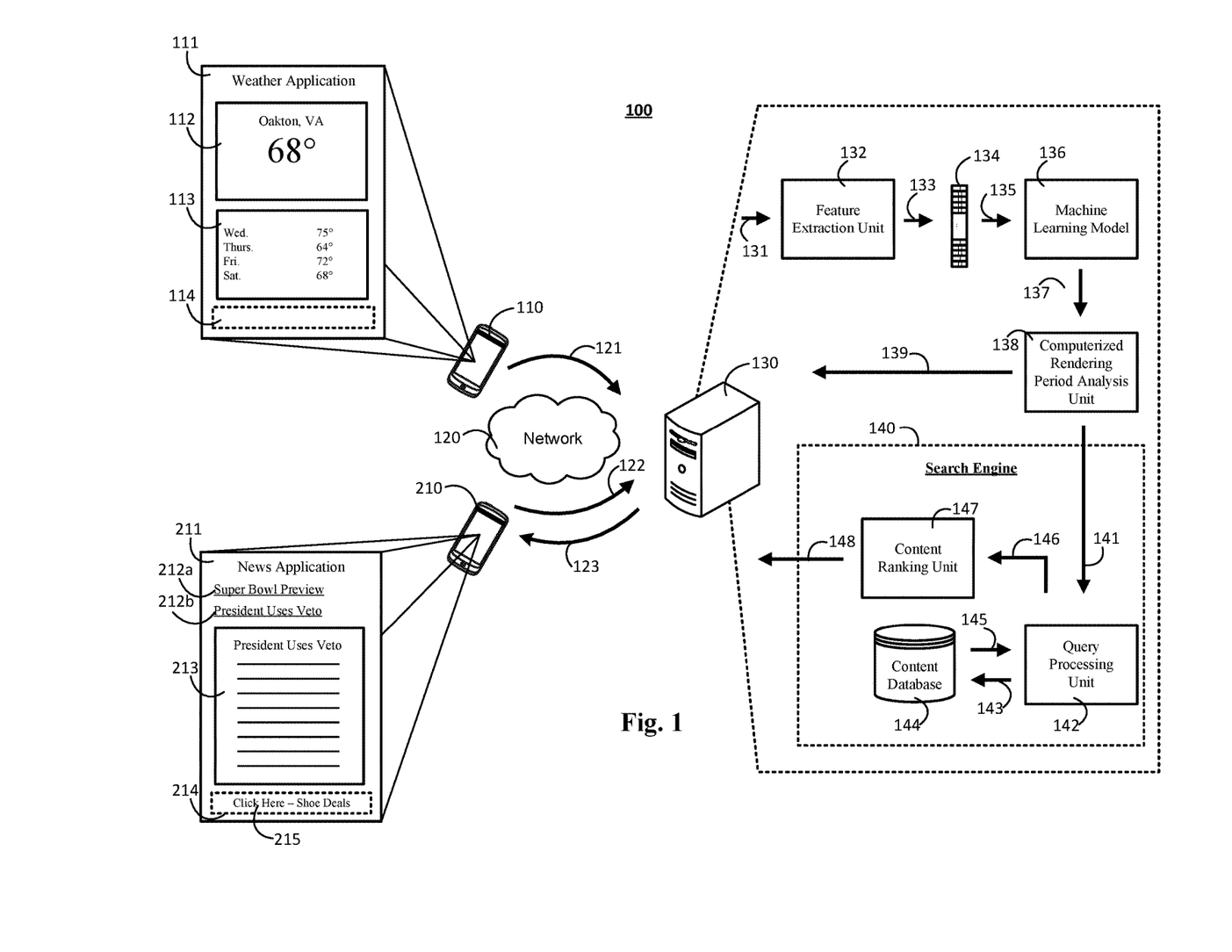
FIG. 1 is a diagram of an example of a system for determining when to execute a query based on a predicted computerized rendering period.

FIG. 1 is a diagram of an example of a system 100 (e.g., a search and retrieval system) for determining whether to execute a query based on a predicted computerized rendering period. The system 100 includes a client device 110, a network 120, a server 130, and a client device 210. Though the example of system 100 provided in this specification includes two client devices 110, 210, the present disclosure need to be so limited. Instead, the system described by this specification may also be used with only one client device or more than two client devices.

The server 130 may include one or more units. In this specification, the term "unit" will be used broadly to refer to a software based system or subsystem that can perform one or more specific functions. Generally, a unit will be implemented as one or more software modules or components, installed on one or more computers in one or more locations; in other cases, multiple units can be installed on the same computer or computers.

A user of a client device such as client device 110 can input an instruction to open an application. For example, a user may select an icon displayed in a user interface of the client device 110 that initiates opening of a weather application. Alternatively, the user may utter a voice command that instructs an automated assistant application installed and executing on the client device 110 to open a weather application. Opening a weather application results in the display of the graphical user interface 111 in the user interface of the client device 110. As the user interface 111 is being generated, the application instructs the device 110 to obtain data related to the current temperature of a particular location 112 and one or more future temperatures for the particular location 113. In addition, the application also instructs the client device 110 to transmit a query 121 to the server 130 for a content item that can be displayed in region 114 of the graphical user interface 111. The content item requested by the query 121 may include, for example, an image, a video, text, a combination thereof, or the like. In some implementations, the content item may include an advertisement for a product, service, event, or the like. The query 121 may be transmitted via a network 120. The network 120 may include a LAN, a WAN, a cellular network, the Internet, or a combination thereof.

The server 130 receives the query 121 and provides 131 the query 121 as an input to a feature extraction unit 132. In some implementations, the server 130 may have a query receiving unit that is separate from the feature extraction unit 132 and that functions to receive data from a client device 110, 210 and provide one or more portions of the received data to the feature extraction unit 132. Alternatively, the query receiving unit functionality may be integrated into the feature extraction unit 132 so that the feature extraction unit can receive the query 121 without the need of a separate query receiving unit.

The received query 121 may include (i) one or more query terms and (ii) data related to the current context of the client device 110. The current context of the client device 110 may include, for example, data indicative of the application that generated the query 121, data indicative of the user's history of application use, or the like. The feature extraction unit 132 extracts features from the query 121 that can be used to generate a query vector 134. The query vector 134 is a numerical representation of the one or more search terms and the context information received from the client device 110. The numerical relationship quantifies a relationship between the received query 121 and an established feature vector vocabulary. The feature vector vocabulary may include many entries that include an entry for each known word, an entry for each application installed on the client device, one or more entries related to a user's historical use of applications on the client device 110 (e.g., average length of time using application), and the like.

The query feature vector 134 is provided 135 as an input to a machine learning model 136 that has been trained to predict the likelihood that a query is associated with a computerized rendering period that satisfies a predetermined threshold. The machine learning model 136 may be a logistic regression model that includes labels that define a first value such as "0" if the computerized rendering period is likely to be larger than a predetermined threshold (e.g., 1 second, 3 seconds, 5 seconds, or the like) or labels that define a second value such as "1" if the computerized rendering period is likely to be less than a predetermined threshold (e.g., 1 second, 3 seconds, 5 seconds, or the like). The trained machine learning model 136 may process the received query vector 134 and generate an output label 137 that classifies the received query vector 134 as being associated with the first value or the second value. Though this implementation of the present disclosure uses a logistic regression model, other types of machine learning models can be used. For example, a neural network or other type of machine learning model that is capable of being trained to process an input and classify the input into one of a plurality of output classes may be used as the machine learning model.

The output label 137 is provided to a computerized rendering period analysis unit 138 that can determine whether the output label 137 indicates that the predicted computerized rendering period for a query 121 satisfies a predetermined threshold. In one implementation, a predicted computerized rendering period for display of content items responsive to the query 121 may satisfy a predetermined threshold if the machine learning model 136 outputs a label 137 indicating that the predicted computerized rendering period exceeds the predetermined threshold. Alternatively, a predicted computerized rendering period for display of content items responsive to the query 137 may not satisfy a predetermined threshold if the machine learning model 136 outputs a label 137 indicating that the predicted computerized rendering period does not exceed the predetermined threshold.

Based on the output label 137 generated by processing of the query vector 134 by the machine learning model 136, the computerized rendering period analysis unit 138 determines whether the query 121 should be executed. In particular, if the computerized rendering period analysis unit 138 determines that the output 137 of the machine learning model 136 indicates that a predicted computerized rendering period for content items responsive to the query 121 is not predicted to satisfy the predetermined threshold, the computerized rendering period analysis unit 138 may decide to avoid processing the query 121. In such a scenario, the computerized rendering period analysis unit 138 will instruct 139 the server 130 to not use the search engine 140 to execute the query 121. A search engine may include, for example, one or more software components that are stored and executed on a device or collection of devices which can use a query (in any form e.g., text, image, or audio) to identify content stored in a data structure.

In the example of system 100, the machine learning model 136 may predict that the computerized rendering period for content items responsive to the query 121 is not likely to satisfy a predetermined threshold based, at least in part, on features of the feature vector that indicate the context of the client device 110 such as the type of application that originated the query 121. For example, the machine learning model 136 can be trained to learn that applications such as the weather application that provides the user interface 111 are not typically associated with high computerized rendering periods. This is because, a user typically opens a weather application, sees the current or future forecast, and then closes the weather application. As a result, the weather application may typically be associated with a low computerized rendering period such as 1 second or less. In such instances, the system 100 can determine not execute the query 121 in an effort to conserve the system's 100 computational resources. Avoiding execution of the query 121 should not impact user experience because it is predicted that the user is not going to have the user interface 111 open and displayed in the user interface of the client device 110 for a long enough time to receive a content item for display in region 114 based on the query 121, view the content item that would be displayed in region 114 returned in response to the query 121, and then click the content item that would be displayed in region 114. In some implementations, the region 114 of the user interface 111 may be left empty when execution of the query 121 is avoided.

Instructing 139 the server 130 to not execute the query 121 increases the efficiency of system 100 because the server does not need to expend computational resources to necessary for the query processing unit 142 to execute the query 121. Moreover, the system 100 is able to bypass computationally expensive operations of search result scoring and ranking that are performed by the content ranking unit 147. Thus, the system 100 can save on the expenditure of computational resources by not executing queries such as query 121 that are predicted by the machine learning model 136 to be associated with a computerized rendering period that does not satisfy a predetermined threshold.

A user of a client device such as client device 210 can also input an instruction to open an application. For example, the user may select an icon displayed in a user interface of the client device 210 that initiates opening of a news application. Alternatively, the user may utter a voice command that instructs an automated assistant application installed and executing on the client device 210 to open a news application. Opening the news application results in the display of the graphical user interface 211 in the user interface of the client device 210. As the user interface 211 is being generated, the application instructs the client device 210 to obtain data related to one or more news headlines. The data related to news headlines may be displayed as selectable text, images, icons, or like 212a, 212b that are associated with a network address. In response to the selection of one of the selectable text, images, icons, or the like, the client device may retrieve data related to a news article 213 from the network address associated with the selected text, image, icon, or the like. In addition, the application also instructs the client device 210 to transmit a query 122 to the server 130 for a content item that can be displayed in region 214 of the graphical user interface 211. The content item requested by the query 122 may include, for example, an image, a video, text, a combination thereof, or the like. The content item may be associated with a network address and be rendered in the region 214 of the user interface 211 in a manner that makes the content item selectable. Upon selection of the content item, the client device may generate a user interface based on data obtained from the network address associated with the content item.

The server 130 receives the query 122 and provides 131 the query 122 as an input to a feature extraction unit 132. The received query 122 is substantially similar to the previously received query 121. For example, the query 122 may also include (i) one or more query terms and (ii) data related to the current context of the client device 110. However, query 122 originated from a news application as opposed to a weather application. In this example, a news application is a type of application that a user (or client device) may leave open for a longer period of time while, for example, a user of the client device 210 reads one or more news articles such as news article 213.

The feature extraction unit 132 extracts features from the query 122 that can be used to generate a query vector as described above. The query vector is provided 135 as an input to a machine learning model 136 that has been trained to predict the likelihood that a computerized rendering period associated with the query vector satisfies a predetermined threshold. The trained machine learning model 136 may process the received query vector and generate an output label that is indicative of a likelihood that the computerized rendering period for content items returned in response to the query 122 satisfies a predetermined threshold. For example, the output label includes data that is indicative of whether the predicted computerized rendering period for display of content items responsive to the query satisfies a predetermined threshold (e.g., 1 second, 3 seconds, 5 seconds, or the like).

The output label output by the machine learning model 136 is provided to the computerized rendering period analysis unit 138. The computerized rendering period analysis unit 138 can determine whether the output label indicates that the predicted computerized rendering period for a query 122 satisfies a predetermined threshold. Based on this determination, the computerized rendering period analysis unit 138 can determine whether to instruct the query processing unit 142 to execute the query 122. For example, if the computerized rendering period analysis unit 138 determines that the output of the machine learning model 136 indicates that it is likely that the computerized rendering period for content items responsive to the query 122 will not satisfy the predetermined threshold, the computerized rendering period analysis unit 138 may decide to avoid processing the query 139. In such a scenario, the computerized rendering period analysis unit 138 will instruct 139 the server 130 to not use the search engine 140 to execute the query 121. Alternatively, if the computerized rendering period analysis unit 138 determines that the output of the machine learning model 136 indicates that a predicted computerized rendering period for the content items responsive to the query 122 is predicted to satisfy the predetermined threshold, the computerized rendering period analysis unit 138 instructs a search engine 140 to execute a query. For example, the computerized rendering period analysis unit 138 can instruct 141 a query processing unit 142 to execute the query 122.

In the example of system 100, the machine learning model 136 predicts that the computerized rendering period for content items responsive to the query 122 is likely to satisfy a predetermined threshold based, at least in part, on features of the feature vector that indicate the context of the client device 210 such as the type of application that originated the query 122. For example, the machine learning model 136 can be trained to learn that applications such as the news application that provides the user interface 211 are typically associated with high computerized rendering periods. This is because, a user typically opens a news application, selects data corresponding to one or more headlines, and then reads, or at least skims, through an article of interest. Alternatively, the user may take sufficient time to simply read a plurality of headlines provided by the new application. As a result, the news application may typically be associated with a sufficient computerized rendering period such as more than 1 second, more than 3 seconds, or the like. In such instances, the system 100 can determine that expending computational resources by using a search engine 140 to execute the query 122 is acceptable because the user will be viewing the graphical user interface 211 long enough to view a content item returned in response to the query 122 and potentially click on the content item.

The search engine 140 can use a query processing unit 142 to execute the query 122 by searching 143 the content database 144 using the query 122. The content database 144 may include a plurality of content items such as an image, a video, text, a combination thereof, or the like. In some implementations, the content database 144 may include images, videos, text, or a combination thereof, that include advertisements for a product, service, event, or the like. One or more content items that are responsive to the query 122 may be identified during the search of the content database, and the one or more content items can be returned 145 to the query processing unit 142. The query processing unit 142 may provide 146 the one or more content items to content ranking unit 147. Alternatively, in some implementations, the content database may provide the identified one or more content items that are responsive to the query 122 to the content ranking unit 147 without routing the one or more content items through the query processing unit 142.

The content ranking unit 147 may use one or more scoring algorithms to generate one or more scores for each of the one or more content items that were identified as responsive to the query 122. The scores may include a quality score that rates the quality of the content item, a popularity score that rates the popularity of the content item, a confidence score that indicates the likelihood that a user of the client device will click the content item, or the like. The content ranking unit 147 may then rank the one or more content items based on the one or more scores. Then, one or more of the content items may be selected based on one or more generated scores. In some implementations, the highest ranked content item may be selected for transmission 123 to the client device 210. The one or more content items can then be displayed 215 in the region 214.

In some implementations, a plurality of content items may be returned to the client device for display. In such instances, multiple different content items may be provided for display in the region 214. Alternatively, though a plurality of content items may be returned to the client device 210, the client device 210 may cache one or more of the plurality of content items and then periodically replace a displayed content item in region 214 with another in a cyclical manner, one-at-a-time, two-at-a-time, or the like.

The use of a machine learning model's prediction of whether a computerized rendering period of content items provided in response to a query exceeds a predetermined threshold is just one example of the use the subject matter described with reference to FIG. 1. This is because there are other implementations where the use of a predicted computerized rendering period can be useful.

For example, a logic execution system (e.g., an auction system) may be provided that executes one or more logic instructions (e.g., to execute an auction) and receives selection instructions with regard to one or more search terms to trigger display of a content item. The logic execution system may be configured to receive a set of one or more keywords that a user is interested in, and then initiate a logic execution instruction (e.g., auto-bidding) on one or more keywords from the set of keywords. In some implementations, a predicted computerized rendering period can be used to determine whether or not a logic execution instruction should be submitted. For instance, one or more search words may be offered for bid. Prior to initiating a logic execution instruction on behalf of the user, the logic execution system may use the machine learning model 136 and computerized rendering period analysis unit 138 to determine whether the computerized rendering period for search results corresponding to content items responsive to a query based on the keywords up for bid satisfies a predetermined threshold (e.g., 1 second, 3 seconds, 5 seconds, or the like).

The logic execution system can be configured to not allow a logic execution instruction to execute if the machine learning model 136 and computerized rendering period analysis unit 138 determine that the computerized rendering period for search results corresponding to content items responsive to the query does not satisfy a predetermined threshold. Such a system provides the advantage of avoiding initiation of a logic execution instruction on one or more keywords that would not result in a computerized rendering period that provides an opportunity for the user to view and click the content item provided in response to the query. In some implementations, a user may be able to provide an input to the auction system specifying a minimum computerized rendering period that must be associated with one or more keywords in order for the auction system to allow a logic execution instruction to occur on behalf of the user.

Figure 2:
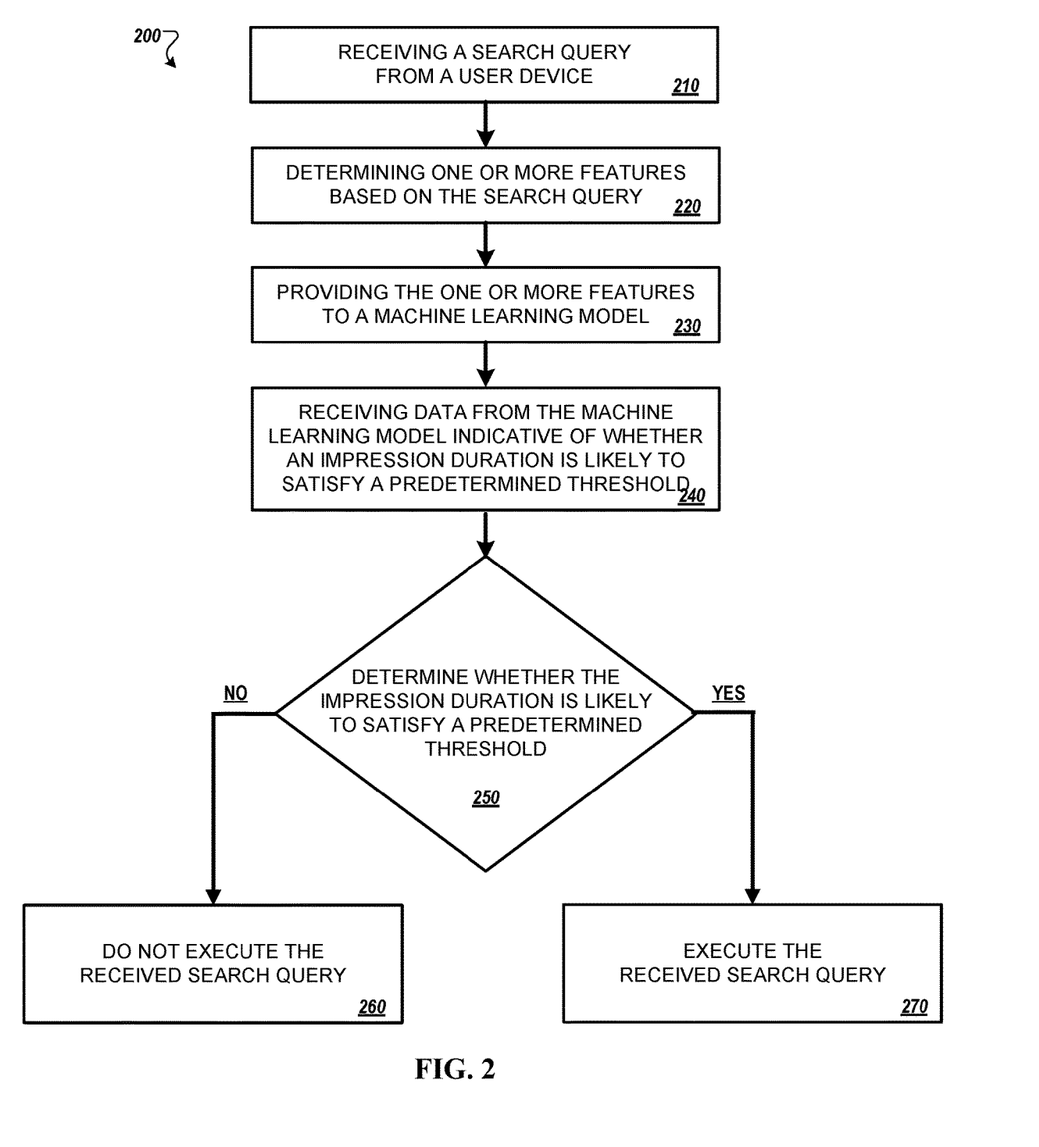
FIG. 2 is a flowchart of an example of a process for determining when to execute a query based on a predicted computerized rendering period.

FIG. 2 is a flowchart of an example of a process 200 for determining whether to execute a query based on a predicted computerized rendering period. For convenience, the process 200 will be described as being performed by a system of one or more computers located in one or more locations. For example, a system such as the system 100 can be appropriately programmed in accordance with this specification to perform the process 200.

The process 200 begins with the system receiving 210 a query from a client device. The query may be generated by an application and include a request for a content item. The query may include (i) one or more query terms and (ii) data related to the current context of the client device 110. The current context of the client device 110 may include, for example, data indicative of the application that generated the query, data indicative of the user's history of application use, or the like.

The system determines 220 one or more features based on the received query. Features extracted from the query include features related to the words of the query, the current context of the query, or the like. The extracted features can be used to generate a query vector based on the set of extracted features. The query vector is a numerical representation of the one or more search terms and the context information received from the client device. The numerical relationship quantifies a relationship between the received query and an established feature vector vocabulary. The feature vector vocabulary may include many entries that include, an entry for each known word, an entry for each application installed on the client device, one or more entries related to a user's historical use of applications on the client device (e.g., average length of time using application), and the like.

The system provides 230 the one or more features determined at stage 220 as an input to a machine learning model that has been trained to predict a computerized rendering period. In some implementations, the one or more features provided as an input to the machine learning model may be in the form of a query vector generated at stage 220. The machine learning model may include a logistic regression model that includes labels that defined as a first value such as "0" if the computerized rendering period is likely to satisfy a predetermined threshold (e.g., equal to or larger than 1 second, 3 seconds, 5 seconds, or the like) or labels defined as a second value such as "1" if the computerized rendering period is likely to be less than a predetermined threshold (e.g., less than 1 second, 3 seconds, 5 seconds, or the like). The trained machine learning model may process the received query vector and generate an output label that is indicative of a predicted computerized rendering period. The system may receive 240 output data from the machine learning model indicative of whether a computerized rendering period is likely to satisfy a predetermined threshold.

The received output data may include, for example, the output label generated by the machine learning model.

Though some implementations of process 200 may use a logistic regression model, the present disclosure need not be so limited. Instead, any type of machine learning model capable of processing an input and classifying the input into a particular class of a plurality of classes can be trained to predict a computerized rendering period for a query vector. For example, in one implementation, a neural network system may be used as the machine learning model.

The system determines 250 whether the computerized rendering period is likely to satisfy a predetermined threshold. Determining whether the computerized rendering period is likely to satisfy a predetermined threshold may include analyzing the output data received from the machine learning model. For example, if the system determines at stage 250 that the output of the machine learning model indicates that a predicted computerized rendering period for content items responsive to the query is not likely to satisfy the predetermined threshold, the system can decide to not execute 260 the query.

Determining, based on the output of the machine learning model whether a computerized rendering period is likely to satisfy a predetermined threshold, may include evaluating a probability output by the machine learning model. For example, the system may determine that a computerized rendering period does not satisfy the predetermined threshold if the output of the machine learning model indicates that there is a higher probability that the computerized rendering period does not exceed the threshold than that the computerized rendering period does exceed the predetermined threshold.

Deciding to not execute the query increases the efficiency of the system because the system does not need to expend computational resources to execute a query whose results cannot be viewed or clicked-on due to low computerized rendering period times. Moreover, the system is able to bypass computationally expensive operations such as search result scoring and ranking that would be performed on a set of generated search results if the query was executed. Thus, the system can save on the expenditure of computational resources by not executing queries that are predicted by the machine learning model to be associated with a computerized rendering period that does not satisfy a predetermined threshold.

Alternatively, the system can determine at stage 250 that the output of the machine learning model indicates that a predicted computerized rendering period for content items responsive to the query is likely to satisfy a predetermined threshold. In such instances, the system can decide to execute 270 the received query. The system may execute the query by searching a content database using the query. The content database may be hosted by the system, or maintained by a remote third-party server(s). The content database 144 may include a plurality of content items such as an image, a video, text, a combination thereof, or the like. In some implementations, the content database may include images, videos, text, or a combination thereof, that include content items associated with a product, service, event, or the like.

As described above, determining, based on the output of the machine learning model whether a computerized rendering period is likely to satisfy a predetermined threshold, may include evaluating a probability output by the machine learning model. For example, the system may determine that a computerized rendering period does satisfy the predetermined threshold if the output of the machine learning model indicates that there is a higher probability that the computerized rendering period does exceed the threshold than that the computerized rendering period does not exceed the predetermined threshold.

One or more content items that are responsive to the query may be identified during the search of the content database, and the one or more content items can be scored by the system using one or more content scoring algorithms. For example, the system may score content items using a quality score, popularity score, a confidence score, or the like. The system may then rank the one or more content items based on the one or more scores. Then, one or more of the ranked content items may be selected for transmission to the client device that is connected to the system using a network. In some implementations, the highest ranked content item may be selected for transmission to the client device. The one or more content items can then be displayed in the user interface of a client device.

The process 200 can be performed for a query vector for which the desired output, i.e., an indication of whether a computerized rendering period associated with the query upon which the query vector is based satisfies a predetermined threshold, is not known. The system can also perform the process 200 on inputs in a set of training data, i.e., a set of inputs for which the output that should be predicted by the system is known, in order to train the system, i.e., to determine trained values for parameters of the machine learning model. In particular, the process 200 can be performed repeatedly on inputs selected from a set of training data as part of a conventional machine learning training technique to train the neural networks, e.g., stochastic gradient descent backpropagation through time training technique.

Figure 3:
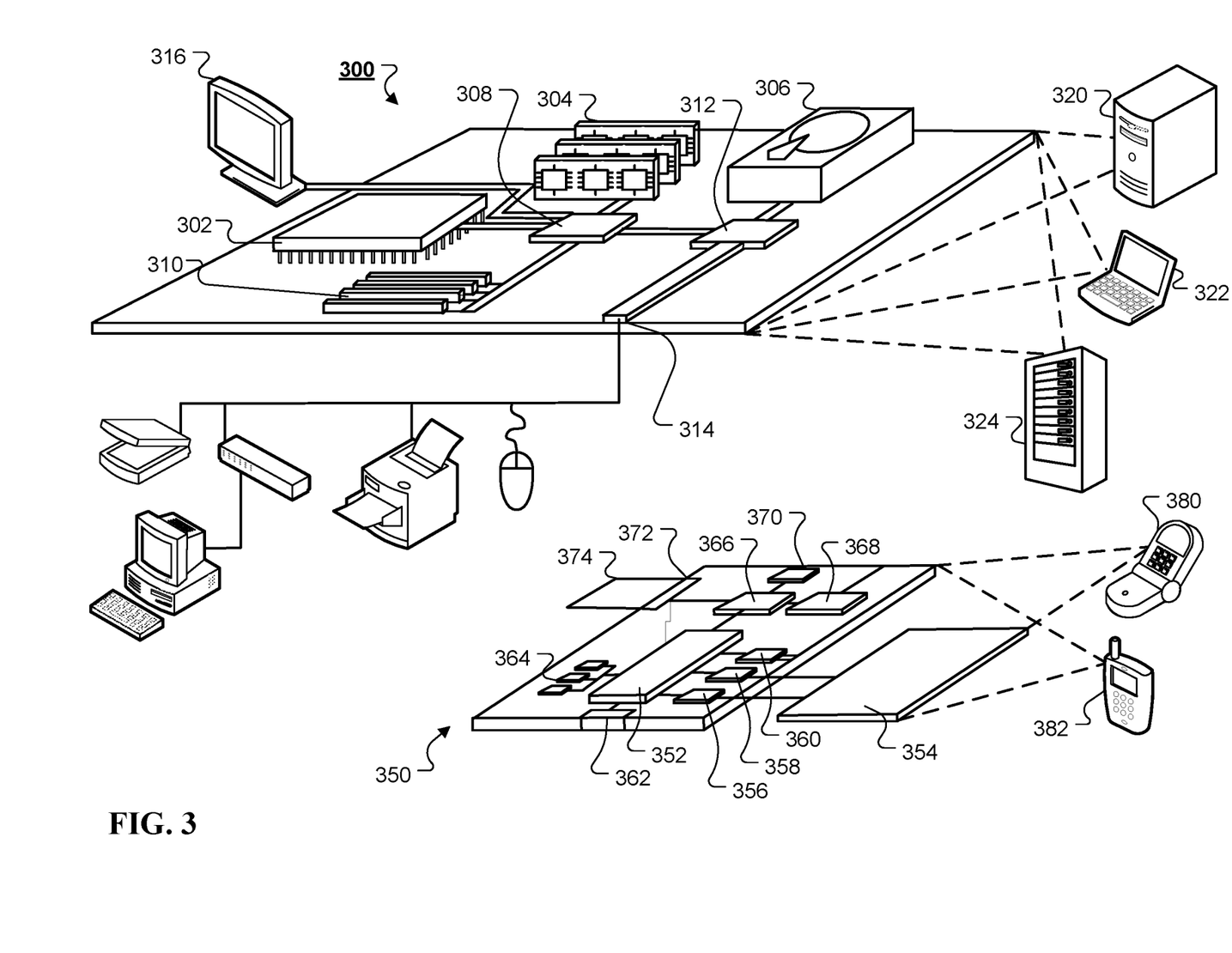
FIG. 3 is a block diagram of components of a system for determining when to execute a query based on a predicted computerized rendering period.

FIG. 3 is a block diagram of components of a system for determining when to execute a query based on a predicted computerized rendering period.

The computing device 300 is intended to represent various forms of digital computers, such as laptops, desktops, workstations, personal digital assistants, servers, blade servers, mainframes, and other appropriate computers. The mobile computing device 350 is intended to represent various forms of mobile computing devices, such as desktops, laptops, tablets, personal digital assistants, cellular telephones, smart-phones, and other similar computing devices. The components shown here, their connections and relationships, and their functions, are meant to be examples only, and are not meant to be limiting.

The computing device 300 includes a processor 302, a memory 304, a storage device 306, a high-speed interface 308 connecting to the memory 304 and multiple high-speed expansion ports 310, and a low-speed interface 312 connecting to a low-speed expansion port 314 and the storage device 306. Each of the processor 302, the memory 304, the storage device 306, the high-speed interface 308, the high-speed expansion ports 310, and the low-speed interface 312, are interconnected using various busses, and may be mounted on a common motherboard or in other manners as appropriate. The processor 302 can process instructions for execution within the computing device 300, including instructions stored in the memory 304 or on the storage device 306 to display graphical information for a graphical user interface (GUI) on an external input/output device, such as a display 316 coupled to the high-speed interface 308. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multiprocessor system).

The memory 304 stores information within the computing device 300. In some implementations, the memory 304 is a volatile memory unit or units. In some implementations, the memory 304 is a non-volatile memory unit or units. The memory 304 may also be another form of computer-readable medium, such as a magnetic or optical disk.\The storage device 306 is capable of providing mass storage for the computing device 300. In some implementations, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. In other implementations, storage device 306 may include one or multiple cloud-based storage devices. Instructions can be stored in an information carrier. The instructions, when executed by one or more processing devices (for example, processor 302), perform one or more methods, such as those described above. The instructions can also be stored by one or more storage devices such as computer- or machine-readable mediums (for example, the memory 304, the storage device 306, or memory on the processor 302).

The high-speed interface 308 manages bandwidth-intensive operations for the computing device 300, while the low-speed interface 312 manages lower bandwidth-intensive operations. Such allocation of functions is an example only. In some implementations, the high-speed interface 308 is coupled to the memory 304, the display 316 (e.g., through a graphics processor or accelerator), and to the high-speed expansion ports 310, which may accept various expansion cards. In the implementation, the low-speed interface 312 is coupled to the storage device 306 and the low-speed expansion port 314. The low-speed expansion port 314, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. In addition, it may be implemented in a personal computer such as a laptop computer 322. It may also be implemented as part of a rack server system 324. Alternatively, components from the computing device 300 may be combined with other components in a mobile computing device, such as a mobile computing device 350. Each of such devices may contain one or more of the computing device 300 and the mobile computing device 350, and an entire system may be made up of multiple computing devices communicating with each other.

The mobile computing device 350 includes a processor 352, a memory 364, an input/output device such as a display 354, a communication interface 366, and a transceiver 368, among other components. The mobile computing device 350 may also be provided with a storage device, such as a micro-drive or other device, to provide additional storage. Each of the processor 352, the memory 364, the display 354, the communication interface 366, and the transceiver 368, are interconnected using various buses, and several of the components may be mounted on a common motherboard or in other manners as appropriate.

The processor 352 can execute instructions within the mobile computing device 350, including instructions stored in the memory 364. The processor 352 may be implemented as a chipset of chips that include separate and multiple analog and digital processors. The processor 352 may provide, for example, for coordination of the other components of the mobile computing device 350, such as control of user interfaces, applications run by the mobile computing device 350, and wireless communication by the mobile computing device 350.

The processor 352 may communicate with a user through a control interface 358 and a display interface 356 coupled to the display 354. The display 354 may be, for example, a TFT (Thin-Film-Transistor Liquid Crystal Display) display or an OLED (Organic Light Emitting Diode) display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may provide communication with the processor 352, so as to enable near area communication of the mobile computing device 350 with other devices. The external interface 362 may provide, for example, for wired communication in some implementations, or for wireless communication in other implementations, and multiple interfaces may also be used.

The memory 364 stores information within the mobile computing device 350. The memory 364 can be implemented as one or more of a computer-readable medium or media, a volatile memory unit or units, or a non-volatile memory unit or units. An expansion memory 374 may also be provided and connected to the mobile computing device 350 through an expansion interface 372, which may include, for example, a SIMM (Single In Line Memory Module) card interface. The expansion memory 374 may provide extra storage space for the mobile computing device 350, or may also store applications or other information for the mobile computing device 350. Specifically, the expansion memory 374 may include instructions to carry out or supplement the processes described above, and may include secure information also. Thus, for example, the expansion memory 374 may be provided as a security module for the mobile computing device 350, and may be programmed with instructions that permit secure use of the mobile computing device 350. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier that the instructions, when executed by one or more processing devices (for example, processor 352), perform one or more methods, such as those described above. The instructions can also be stored by one or more storage devices, such as one or more computer- or machine-readable mediums (for example, the memory 364, the expansion memory 374, or memory on the processor 352). In some implementations, the instructions can be received in a propagated signal, for example, over the transceiver 368 or the external interface 362.

The mobile computing device 350 may communicate wirelessly through the communication interface 366, which may include digital signal processing circuitry where necessary. The communication interface 366 may provide for communications under various modes or protocols, such as GSM (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 368 using a radio-frequency. In addition, short-range communication may occur, such as using a Bluetooth, WiFi, or other such transceiver. In addition, a GPS (Global Positioning System) receiver module 370 may provide additional navigation- and location-related wireless data to the mobile computing device 350, which may be used as appropriate by applications running on the mobile computing device 350.

The mobile computing device 350 may also communicate audibly using an audio codec 360, which may receive spoken information from a user and convert it to usable digital information. The audio codec 360 may likewise generate audible sound for a user, such as through a speaker, e.g., in a handset of the mobile computing device 350. Such sound may include sound from voice telephone calls, may include recorded sound (e.g., voice messages, music files, etc.) and may also include sound generated by applications operating on the mobile computing device 350.

The mobile computing device 350 may be implemented in a number of different forms, as shown in the figure. For example, it may be implemented as a cellular telephone 380. It may also be implemented as part of a smart-phone 382, personal digital assistant, tablet, laptop, desktop, or other similar mobile computing device.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

The invention claimed is:

1. A system comprising:
   a receiving unit that receives a query that originated from a client device, wherein the query comprises a request for one or more content items that are stored in a database;
   a feature extraction unit that:
      determines a set of one or more features based on the query;
      generates a query vector based on the set of one or more features; and
      provides the query vector to a machine learning model that has been trained to provide an output that is indicative of whether a computerized rendering period for displaying a set of one or more candidate content items that are each responsive to the query satisfies a predetermined threshold, wherein the computerized rendering period is an amount of time that content items will remain visually perceptible at a client device when displayed; and
   a computerized rendering period analysis unit that:
      receives first data, based on the output of the machine learning model, that is indicative of whether the computerized rendering period for displaying the set of one or more candidate content items that are each responsive to the query satisfies the predetermined threshold;
      determines, based on the first data, when the computerized rendering period available for displaying the set of one or more candidate content items that are each responsive to the query does not satisfy the predetermined threshold; and
      in response to determining that the computerized rendering period available for displaying the set of one or more candidate items that are each responsive to the query does not satisfy the predetermined threshold, determines to not use a search engine to execute the received query.

2. The system of claim 1, wherein the computerized rendering period analysis unit further determines when the computerized rendering period available for displaying the set of one or more candidate content items that are each responsive to the query does satisfy the predetermined threshold and responsive to determining that the computerized rendering period available for displaying the set of one or more candidate items that are each responsive to the query does satisfy the predetermined threshold, determining to use the search engine to execute the received query.

3. The system of claim 1, wherein the machine learning model has been trained to provide the output that is indicative of whether the computerized rendering period for displaying the set of one or more candidate content items that are each responsive to the query is likely to satisfy the predetermined threshold.

4. The system of claim 1, wherein the one or more features are derived from context information describing an application that originated the query.

5. The system of claim 1, wherein the machine learning model comprises a logistic regression model.

6. The system of claim 1, wherein the predetermined threshold comprises a time period of one second.

7. A computer-implemented method, comprising:
   receiving, by one or more server computers, a query that originated from a client device, wherein the query comprises a request for one or more content items that are stored in a database;

determining, by the one or more server computers, a set of one or more features based on the query;

generating, by the one or more server computers, a query vector based on the set of one or more features;

providing, by the one or more server computers, the query vector to a machine learning model that has been trained to provide an output that is indicative of whether a computerized rendering period for displaying a set of one or more candidate content items that are each responsive to the query satisfies a predetermined threshold, wherein the computerized rendering period is an amount of time that content items will remain visually perceptible at a client device when displayed;

receiving, by the one or more server computers, first data, based on the output of the machine learning model, that is indicative of whether the computerized rendering period for displaying the set of one or more candidate content items that are each responsive to the query satisfies the predetermined threshold;

determining, by the one or more server computers based on the first data, when the computerized rendering period available for displaying the set of one or more candidate content items that are each responsive to the query does not satisfy the predetermined threshold; and in response to determining, by the one or more server computers, that the computerized rendering period available for displaying the set of one or more candidate items that are each responsive to the query does not satisfy the predetermined threshold, determining, by the one or more server computers, to not use a search engine to execute the received query.

8. The computer-implemented method of claim 7, further comprising:

determining, by the one or more server computers based on the first data, when the computerized rendering period available for displaying the set of one or more candidate content items that are each responsive to the search query does satisfy the predetermined threshold; and in response to determining, by the one or more server computers, that the computerized rendering period available for displaying the set of one or more candidate items that are responsive to the query does satisfy the predetermined threshold, determining, by the one or more server computers, to use the search engine to execute the received query.

9. The computer-implemented method of claim 8, the method further comprising:

providing, by the one or more server computers, one or more content items for display in a user interface of the client device.

10. The computer-implemented method of claim 7, wherein the one or more features are derived from context information describing an application that originated the query.

11. The computer-implemented method of claim 7, wherein the machine learning model has been trained to provide the output that is indicative of whether the computerized rendering period for displaying the set of one or more candidate content items that are each responsive to the query is likely to satisfy the predetermined threshold.

12. The computer-implemented method of claim 7, wherein the machine learning model comprises a logistic regression model.

13. The computer-implemented method of claim 7, wherein the predetermined threshold comprises a time period of one second.

14. A non-transitory computer-readable medium encoded with instructions that, when executed by one or more computers, cause the one or more computers to perform the operations comprising:

receiving, by one or more server computers, a query that originated from a client device, wherein the query comprises a request for one or more content items that are stored in a database;

determining, by the one or more server computers, a set of one or more features based on the query;

generating, by the one or more server computers, a query vector based on the set of one or more features;

providing, by the one or more server computers, the query vector to a machine learning model that has been trained to provide an output that is indicative of whether a computerized rendering period for displaying a set of one or more candidate content items that are each responsive to the query satisfies a predetermined threshold, wherein the computerized rendering period is an amount of time that content items will remain visually perceptible at a client device when displayed;

receiving, by the one or more server computers, first data, based on the output of the machine learning model, that is indicative of whether the computerized rendering period for displaying the set of one or more candidate content items that are each responsive to the query satisfies the predetermined threshold;

determining, by the one or more server computers based on the first data, when the computerized rendering period available for displaying the set of one or more candidate content items that are each responsive to the query does not satisfy the predetermined threshold; and in response to determining, by the one or more server computers, that the computerized rendering period available for displaying the set of one or more candidate items that are each responsive to the query does not satisfy the predetermined threshold, determining, by the one or more server computers, to not use a search engine to execute the received query.

15. The computer-readable medium of claim 14, the operations further comprising:

determining, by the one or more server computers based on the first data, when the computerized rendering period available for displaying the set of one or more candidate content items that are each responsive to the search query does satisfy the predetermined threshold; and in response to determining, by the server computer, that the computerized rendering period available for displaying the set of one or more candidate items that are responsive to the query does satisfy the predetermined threshold, determining, by the one or more server computers, to use the search engine to execute the received query.

16. The computer-readable medium of claim 15, the operations further comprising:

providing, by the one or more server computers, one or more content items for display in a user interface of the client device.

17. The computer-readable medium of claim 14, wherein the one or more features are derived from context information describing an application that originated the query.

18. The computer-readable medium of claim 14, wherein the machine learning model has been trained to provide the output that is indicative of whether the computerized rendering period for displaying the set of one or more candidate content items that are each responsive to the query is likely to satisfy the predetermined threshold.

19. The computer-readable medium of claim 14, wherein the machine learning model comprises a logistic regression model.

20. The computer-readable medium of claim 14, wherein the predetermined threshold comprises a time period of one second.

* * * * *

UNITED STATES PATENT AND TRADEMARK OFFICE
CERTIFICATE OF CORRECTION

PATENT NO.       : 10,747,825 B2                                   Page 1 of 1
APPLICATION NO.  : 15/444279
DATED            : August 18, 2020
INVENTOR(S)      : Liu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 451 days.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*